United States Patent [19]
Cohn et al.

[11] Patent Number: 5,408,656
[45] Date of Patent: Apr. 18, 1995

[54] METHOD AND SYSTEM FOR NON-SPECIFIC ADDRESS DATA RETRIEVAL IN A DATA STORAGE SUBSYSTEM WHICH INCLUDES MULTIPLE DATASETS STORED AT SPECIFIC ADDRESSES

[75] Inventors: Oded Cohn, Haifa, Israel; Michael H. Hartung; William F. Micka, both of Tucson, Ariz.; Kenneth M. Nagin, Haifa; Yoram Novick, Haifa, Israel; Nimrod Rotics, Haifa, Israel; Alexander Winokur, Haifa, Israel; Efraim Zeidner, Kiryat Chaim, Israel

[73] Assignee: International Business Machines Corporation, Armonk, N.Y.

[21] Appl. No.: 949,673

[22] Filed: Sep. 23, 1992

[51] Int. Cl.$^6$ .............. G06F 15/40; G06F 13/00; G06F 12/00
[52] U.S. Cl. .............. 395/600; 395/725; 395/425
[58] Field of Search .............. 395/600, 500, 725, 425, 395/400

[56] References Cited

U.S. PATENT DOCUMENTS

| | | | |
|---|---|---|---|
| 3,670,310 | 6/1972 | Bharwani | 395/600 |
| 4,432,057 | 2/1984 | Danielle | 395/725 |
| 4,604,686 | 8/1986 | Reiter | 395/500 |
| 4,611,298 | 9/1986 | Schuldt | 395/600 |
| 4,774,655 | 9/1988 | Mellin | 395/600 |
| 5,202,985 | 4/1993 | Goyal | 395/600 |
| 5,261,065 | 11/1993 | Urabe | 395/425 |

Primary Examiner—Thomas G. Black
Assistant Examiner—Jean R. Homere
Attorney, Agent, or Firm—H. St. Julian; Andrew J. Dillon

[57] ABSTRACT

A method and system for efficiently accessing desired datasets among multiple datasets which are stored at specific data addresses within multiple storage subsystems which are coupled to a host system via a storage subsystem controller and a data channel. A data request is transmitted from the host system to the storage subsystems via the data channel. The data request specifies non-address attributes for desired datasets, such as boundary addresses for large data extents including many datasets or a request for all datasets modified since the occurrence of a specified event. The data request is then processed at the storage subsystem controller to determine a data address for each dataset within the storage subsystem which possess the desired attributes. Thereafter, the desired datasets are transmitted via the data channel to the host system in association with a specific address for each dataset. A selected status message is transmitted from the storage subsystem controller when no more datasets are located which possess the desired attributes. In this manner, the retrieval of data from a storage subsystem is greatly enhanced.

6 Claims, 2 Drawing Sheets

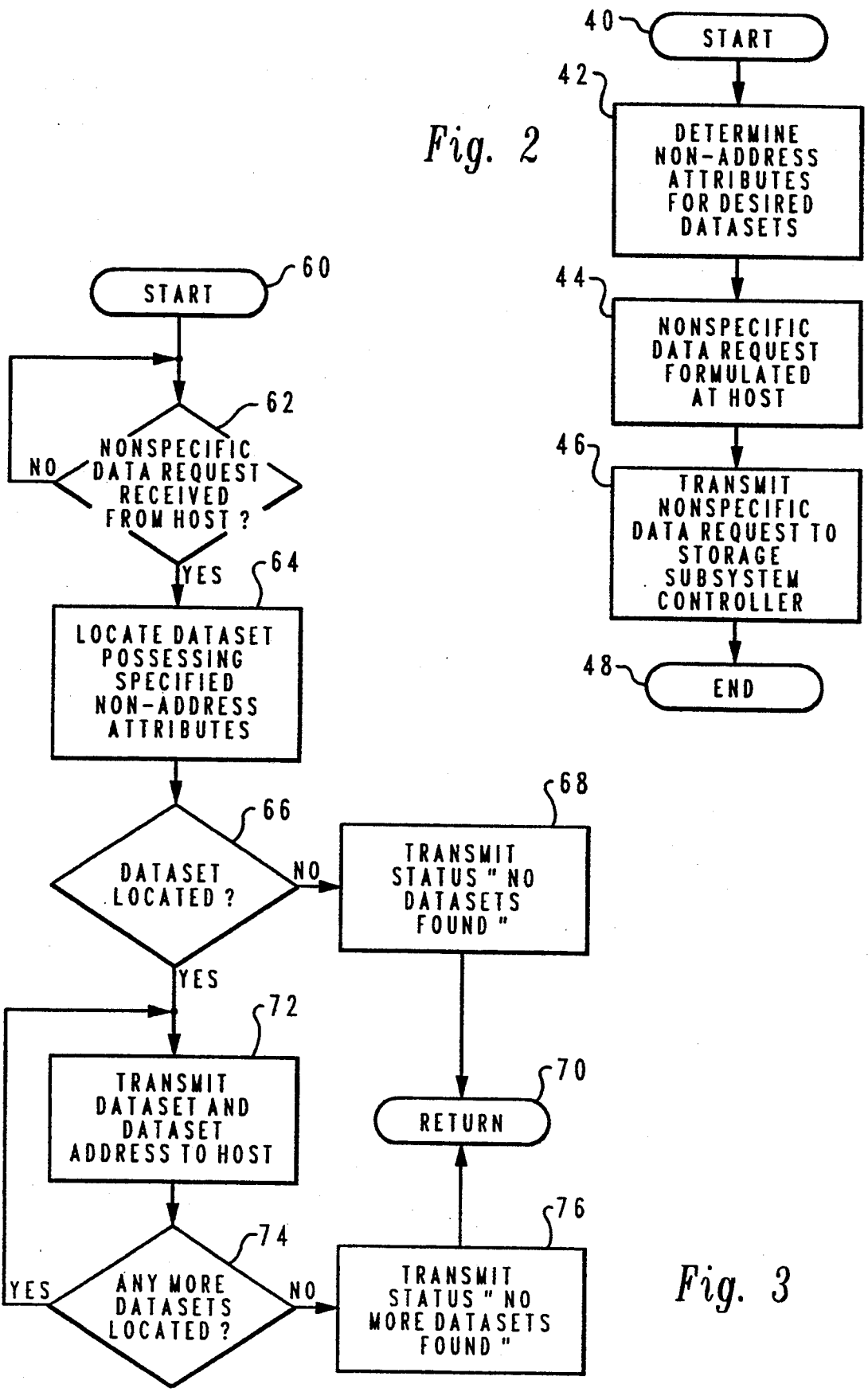

METHOD AND SYSTEM FOR NON-SPECIFIC ADDRESS DATA RETRIEVAL IN A DATA STORAGE SUBSYSTEM WHICH INCLUDES MULTIPLE DATASETS STORED AT SPECIFIC ADDRESSES

BACKGROUND OF THE INVENTION

1. Technical Field

The present invention relates in general to improved methods and systems for managing datasets stored within storage subsystems in a data processing system and in particular to improved methods and systems for accessing desired datasets stored within storage subsystems in a data processing system. Still more particularly, the present invention relates to improved methods and systems for accessing desired datasets within a storage subsystem utilizing non-address attributes set forth within a data request.

2. Description of the Related Art

Data processing systems frequently include large scale storage devices, such as Direct Access Storage Devices (DASD) which are located externally to a host computer system and sometimes at significant distances from the host computer system. Communication from the host computer system to the DASD is typically accomplished over signal cables, extending between the DASD and its control unit and connecting the DASD devices to the host computer system.

Current technology provides DASD units with several separate disks, all rotating on a single spindle. These disks or platters are accessed by head disk assemblies with a transducing head providing access to one surface of each disk. There may be, for example, nine platters in a disk drive providing sixteen surfaces with one of the surfaces used for maintaining accurate tracking capability. In such units there are fifteen usable surfaces for data and when all heads are correctly positioned a cylinder of fifteen physical, recording tracks may be accessed.

DASD units frequently use a so-called "Count-Key-Data" architecture (CKD) where records written on a track within a DASD unit are provided with a count field (an identification), an optional key field and a data field. A record may occupy one or more units of real storage. A "dataset" is a logical collection of multiple records which may be stored on contiguous units of real storage or which may be dispersed. Data is then stored and/or retrieved from a DASD using write and read requests which are issued by the host system. The mechanism which enables host systems to retrieve data which has previously been stored on a disk is the "data disk address." Therefore, when issuing a write request, the host system specifies where on the DASD storage subsystem the data should be placed. Later, if the host system wishes to retrieve this data it will issue a read request utilizing the same address.

Thus, data stored on a disk within a storage subsystem is always associated with a unique data descriptor which identifies that data. In a write request the host specifies the data descriptor together with the data to be stored. In a read request the host specifies the data descriptor of the data it wishes to receive. In response to such a request the DASD subsystem will send the referenced data back to the host. For purposes of explanation herein such read requests which utilize data descriptors are referred to as "specific read requests."

Those skilled in the art will appreciate that it would be advantageous to permit a host system to retrieve data from a DASD subsystem on a basis other than the data descriptor. For example, in cases where the host system requests a large amount of data occupying many disk tracks the efficiency of transferring that data to the host might be enhanced if the order of the transfer is adjusted in order to minimize both seek time and latency time within the data storage subsystem. This is not generally possible since host systems do not know the head location within the DASD subsystem and thus are not able to issue specific read requests which would minimize the disk seek and latency time.

Additionally, many systems exist which are utilized to create so-called "backup" copies of data. In an incremental backup copy only that data which has been modified since the previous copy need be transferred to the host system. In such cases, the host does not initially know what data has been modified and thus the host can not issue specific read requests without issuing a query to the storage subsystem to determine the data descriptors for the data which has been updated since the previous copy. In view of the above, those skilled in the art will appreciate that it would be desirable to permit a host system to retrieve data from a storage subsystem by specifying certain attributes of the data rather than the actual data address.

SUMMARY OF THE INVENTION

It is therefore one object of the present invention to provide an improved method and system for managing datasets stored within storage subsystems in a data processing system.

It is another object of the present invention to provide an improved method and system for accessing desired datasets stored within storage subsystems in a data processing system.

It is yet another object of the present invention to provide an improved method and system for accessing desired datasets within a storage subsystem utilizing non-address attributes set forth within a data request.

The foregoing objects are achieved as is now described. The method and system of the present invention may be utilized to efficiently access desired datasets among multiple datasets which are stored at specific data addresses within multiple storage subsystems coupled to a host system via a storage subsystem controller and a data channel. A data request is transmitted from the host system to the storage subsystems via the data channel. The data request specifies non-address attributes for desired datasets, such as boundary addresses for large data extents including many datasets or a request for all datasets modified since the occurrence of a specified event. The data request is then processed at the storage subsystem controller to determine a data address for each dataset or portions thereof within the storage subsystem which possess the desired attributes. Thereafter, the desired datasets or portions thereof are transmitted via the data channel to the host system in association with a specific address for each dataset or portion thereof. A selected status message is transmitted from the storage subsystem controller when no more datasets are located which possess the desired attributes. In this manner, the retrieval of data from a storage subsystem is greatly enhanced.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a high level logic flowchart illustrating a non-specific data request in accordance with the method and system of the present invention;

FIG. 3 is a high level logic flowchart illustrating a response to a non-specific data request in accordance with the method and system of the present invention.

DETAILED DESCRIPTION OF PREFERRED EMBODIMENT

Figure 1:
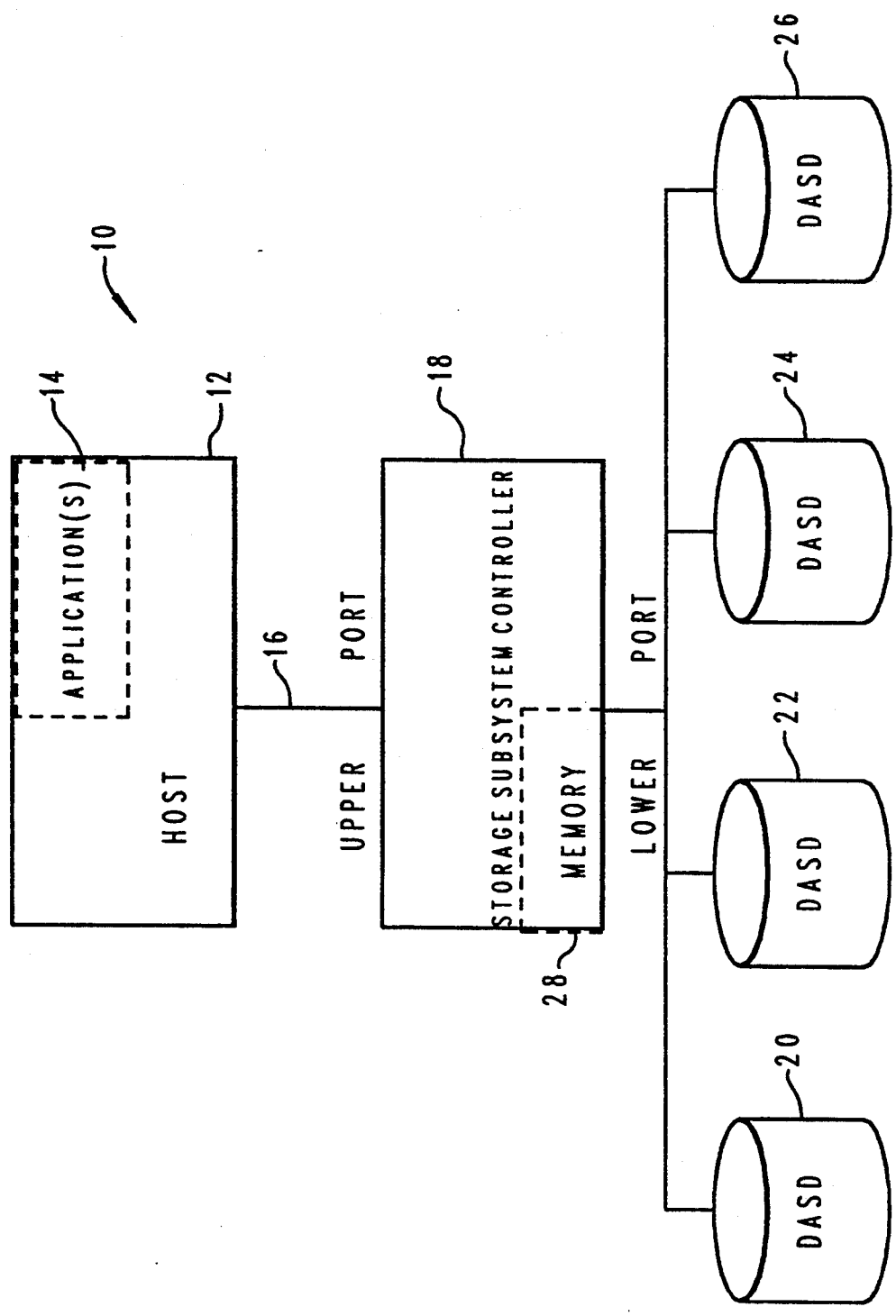
FIG. 1 is a pictorial representation of a data processing system which may be utilized to access desired datasets in accordance with the method and system of the present invention.

With reference now to the figures and in particular with reference to FIG. 1, there is illustrated a pictorial representation of a data processing system 10 which may be utilized to access desired datasets in accordance with the method and system of the present invention. As illustrated, data processing system 10 includes a host computer system 12, which is coupled to a storage system which comprises a plurality of Direct Access Storage Devices (DASD) 20, 22, 24, and 26 via a data channel 16 and a storage subsystem controller 18. Applications 14 within host computer system 12 may be utilized to access and manipulate data stored within the storage subsystem in a manner well known in the art.

Access to desired datasets within the storage subsystem which is comprised of storage subsystem controller 18, DASD 20, DASD 22, DASD 24, and DASD 26 is typically accomplished in the prior art, by setting forth and specifying a unique address or data descriptor for the desired data and transmitting that data descriptor to storage subsystem controller 18 via data channel 16. Data channel 16 may constitute an electrical cable or, in a modern state-of-the-art data processing system may be implemented utilizing a fiber optic cable, such as the International Business Machines Enterprise System Connection (ESCON). Data channel 16 is coupled to the upper port of storage subsystem controller 18 in a manner well known in the art.

Those skilled in the art will appreciate that storage subsystem controller 18 may be implemented utilizing any state-of-the-art storage subsystem controller such as the International Business Machines Corporation Model 3990. Storage system controller 18, in the depicted embodiment of the present invention, includes a memory 28 which may be utilized to store data within storage subsystem controller 18 prior to transmittal of that data to host computer system 12 via data channel 16. Thus, in accordance with the prior art, a specific request by host computer system 12 to read data within the storage subsystem is accomplished by transmitting a specific data address for that data to storage subsystem controller 18, via data channel 16 and retrieving that data from a selected DASD via the lower port of storage subsystem controller 18. That data is then transmitted to host computer system 12 in response to the read request.

As described above, it should be apparent upon reference to the foregoing that the efficiency of retrieval of data from the multiple Direct Access Storage Devices within the storage subsystem may be greatly enhanced by permitting host computer system 12 to retrieve data therefrom utilizing a non-specific read request. That is, a request for data which specifies that data utilizing a non-address attribute. For example, in the transfer of large amounts of data, wherein the order in which the data has been transferred does not matter, the efficiency of the transfer may be greatly enhanced by minimizing seek and latency delays by permitting the storage subsystem to retrieve that data which is physically closest to the head within the Direct Access Storage Device.

This may be accomplished in accordance with the method and system of the present invention by specifying boundary addresses between which all data present is to be retrieved by the storage subsystem controller 18 and transmitted to the host computer system 12. Thus, all data records between those boundary addresses may be retrieved, without specifying exact address data for each desired dataset. As utilized within the present application, the term "non-address attribute" may include the specification of boundary addresses and still be considered a "non-address attribute" since that attribute does not include specific addresses for datasets contained therein.

Similarly, the retrieval of all data which has been modified since a previous backup copy was created may be retrieved by specifying as the non-address attribute those datasets which have been updated subsequent to a specified event. These two examples are merely illustrative of the process by which specific datasets maybe retrieved by specifying non-address attributes in the manner described herein, so long as the attribute is one which is recognized by host computer system 12 and storage subsystem controller 18. Of course, non-address attributes may be transmitted from host computer system 12 or may be predetermined and stored within storage subsystem controller 18 or within a DASD in association with the datasets themselves.

Referring now to FIG. 2, there is depicted a high level logic flowchart which illustrates the generation of a non-specific data request in accordance with the method and system of the present invention. As depicted, the process begins at block 40 and thereafter passes to block 42. Block 42 illustrates a determination of the non-address attribute for the desired datasets. As described above, this non-address attribute may constitute boundary addresses between which all data is to be transferred to the host computer system, or the attribute may constitute all datasets which have been updated subsequent to a specified event within data processing system 10. Thereafter, the process passes to block 44.

Block 44 illustrates the formulation of a non-specific data request at the host. In the depicted embodiment of the present invention this is accomplished by transmitting a specific command to the storage subsystem controller which is previously identified within data processing system 10 as requesting transfer of all data which possesses an attribute which is specified within a field associated with that command. Next, the non-specific data request is transmitted to the storage subsystem controller for processing at the storage subsystem controller. The process of generating a non-specific data request then terminates, as illustrated at block 48.

Referring now to FIG. 3, there is depicted a high level logic flowchart which illustrates a response to a non-specific data request at the storage subsystem controller in accordance with the method and system of the present invention. As depicted, the process begins at block 60 and thereafter passes to block 62. Block 62 illustrates a determination of whether or not a non-specific data request has been received from the host computer system. If not, the process merely iterates until such time as a non-specific data request has been received.

In the event a non-specific data request of the format described above is received from the host computer system, as depicted at block 62, the process passes to block 64. Block 64 illustrates the location by the storage subsystem controller of a dataset which possesses the specified non-address attributes. The process then passes to block 66 which depicts a determination of whether or not a dataset possessing the specified non-address attributes has been located and if not, the process passes to block 68. Block 68 illustrates the transmittal of a status message to the host computer system which indicates "NO DATASETS FOUND" and the process then passes to block 70 and returns.

In this manner, those skilled in the art will appreciate upon reference to the foregoing that by transmitting a non-specific read request from the host computer system to the storage subsystem controller and by permitting the storage subsystem controller to locate datasets within the storage subsystems which possess a specified non-address attribute the efficiency of transferring data to the host computer system may be greatly enhanced, not only by obviating the necessity of transmitting specific data descriptors from the host computer system but also by making it possible to retrieve data where the specific data descriptors are unknown or not determinable.

Referring again to block 66, in the event a dataset possessing the specified non-address attributes has been located, block 72 illustrates the transmittal of that dataset and the dataset address for that dataset to the host computer system. This is an important feature of the present invention since the transmittal of that dataset to the host computer system without including the dataset address will not permit the host computer system to locate that dataset at a subsequent time. Next, the process passes to block 74 which illustrates a determination of whether or not any more datasets have been located which possess the specified non-address attributes contained within the non-specific data requests. If so, the process returns iteratively to block 72 and once again transmits a located dataset and that dataset's address to the host computer system.

Referring again to block 74, in the event no more datasets have been located which possess the specified non-address attributes contained within the non-specific read request, the process passes to block 76. In a manner similar to that described above with respect to block 68, block 76 illustrates the transmitting of a status message to the host computer system which states "NO MORE DATASETS FOUND" and the process then returns, as depicted at block 70.

Upon reference to the foregoing those skilled in the art will appreciate that the Applicants herein have created a data processing system which permits the highly efficient recovery of desired datasets from among a plurality of datasets stored within a storage subsystem without requiring the host computer system to specify specific address locations for those desired datasets. By permitting the host computer system to transmit a non-specific data request which includes a specification of desired non-address attributes for datasets within the storage subsystem, the host computer system may rapidly and efficiently retrieve data stored within the storage subsystem in the manner described herein.

While the invention has been particularly shown and described with reference to a preferred embodiment, it will be understood by those skilled in the art that various changes in form and detail may be made therein without departing from the spirit and scope of the invention.

We claim:

1. A method in a data processing system for efficiently accessing desired datasets among a plurality of datasets which are stored at specific data addresses within a plurality of storage subsystems coupled to a host system via a storage subsystem controller and a data channel and which are retrievable therefrom by specifying said specific data addresses, said method comprising the steps of:

transmitting a data request from said host system to said plurality of storage subsystems via said data channel, said data request specifying a non-address attribute of said desired datasets, said non-address attribute specifying all datasets modified subsequent to a specified event;

processing said data request at said storage subsystem controller to determine a data address for each dataset among said plurality of datasets which possesses said non-address attribute;

accessing each dataset among said plurality of datasets which possess said non-address attribute; and transmitting each dataset possessing said non-address attribute to said host system via said data channel.

2. The method in a data processing system for efficiently accessing desired datasets according to claim 1, wherein said step of transmitting each dataset possessing said non-address attribute to said host system via said data channel further comprises the step of transmitting a specific data address in association with each dataset possessing said non-address attribute.

3. The method in a data processing system for efficiently accessing desired datasets according to claim 1, further including the step of transmitting a selected status message from said storage subsystem controller to said host system in response to a failure of said storage subsystem controller to locate any datasets possessing said non-address attribute.

4. A data processing system for efficiently accessing desired datasets among a plurality of datasets which are stored at specific data addresses within a plurality of storage subsystems coupled to a host system via a storage subsystem controller and a data channel which are retrievable therefrom by specifying said specific data addresses, said data processing system comprising:

means coupled to said data channel for transmitting a data request from said host system to said plurality of storage subsystems via said data channel, said data request specifying a non-address attribute of said desired datasets, said non-address attribute specifying all datasets modified subsequent to a specified event:

means for processing said data request at said storage subsystem controller to determine a data address for each dataset among said plurality of datasets which possesses said non-address attribute;

means for accessing each desired dataset among said plurality of datasets which possess said non-address attributes; and means for transmitting each dataset possessing said non-address attribute to said host system via said data channel.

5. The data processing system for efficiently accessing desired datasets according to claim 4, wherein said means for transmitting each dataset possessing said non-address attribute to said host system via said attribute to said host system via said data channel further comprises means for transmitting a specific data address in association with each dataset possessing said non-address attribute.

6. The data processing system for efficiently accessing desired datasets according to claim 4, further including means for transmitting a selected status message from said storage subsystem controller to said host system in response to a failure of said storage subsystem controller to locate any datasets possessing said non-address attribute.

* * * * *